(12) United States Patent
Willey et al.

(10) Patent No.: US 8,295,861 B2
(45) Date of Patent: Oct. 23, 2012

(54) APPARATUS, AND ASSOCIATED METHOD, FOR PAGING A MOBILE STATION

(75) Inventors: William Daniel Willey, Gilroy, CA (US); Zhijun Cai, Euless, TX (US)

(73) Assignee: Research In Motion Limited, Waterloo (CA)

( * ) Notice: Subject to any disclaimer, the term of this patent is extended or adjusted under 35 U.S.C. 154(b) by 1153 days.

(21) Appl. No.: 11/971,744

(22) Filed: Jan. 9, 2008

(65) Prior Publication Data

US 2009/0176515 A1    Jul. 9, 2009

(51) Int. Cl.
*H04W 68/00* (2009.01)
*G06F 9/26* (2006.01)
*H04J 3/00* (2006.01)
(52) U.S. Cl. .................. 455/458; 711/216; 370/336
(58) Field of Classification Search .................. 455/458; 711/216; 370/336
See application file for complete search history.

(56) References Cited

U.S. PATENT DOCUMENTS

| 6,072,987 | A  | * | 6/2000  | Willey ........................ 340/7.43 |
| 6,754,229 | B1 |   | 6/2004  | Islam et al. |
| 7,248,691 | B1 | * | 7/2007  | Pandit et al. .................... 380/28 |
| 2003/0031140 | A1 |   | 2/2003  | Oprescu-Surcobe et al. |
| 2005/0277429 | A1 |   | 12/2005 | Laroia et al. |
| 2007/0254679 | A1 |   | 11/2007 | Montojo et al. |
| 2007/0259675 | A1 | * | 11/2007 | Worrall ........................ 455/458 |

FOREIGN PATENT DOCUMENTS

WO    2006138625 A2    12/2006

* cited by examiner

*Primary Examiner* — Ariel Balaoing

(57) ABSTRACT

An apparatus, and an associated methodology, for facilitating paging of a mobile station pursuant to a two-step paging procedure. A unique identifier of the mobile station that is to be paged is hashed into a first group of hashed values and at least a second group of hashed values. The first group of hashed values are used by page message generator to generate a page on a first paging channel. And, the second group of values are used by a page message generator to generate a page on a second paging channel. All of the bits of the unique identifier are sent to page the mobile station. The mobile station determines therefrom whether the mobile station has been paged.

13 Claims, 8 Drawing Sheets

| 172 | 174 | 176 | 178 |
|---|---|---|---|
| PCH Assignment information | PI-RNTI adjusted | Other information | PI-RNTI XOR CRC |

| 184 | 186 | 188 | 192 |
|---|---|---|---|
| PCH Assignment information | PI-RNTI adjusted | 10-bit DL-CCH address | PI-RNTI XOR CRC |

| 198 | 202 | 204 | 206 | 208 | 212 |
|---|---|---|---|---|---|
| Address format 1 | Address 1 | Page info 1 | Address format 2 | Address 2 | Page info 2 |

APPARATUS, AND ASSOCIATED METHOD, FOR PAGING A MOBILE STATION

The present disclosure relates generally to a manner by which to facilitate paging of a mobile station. More particularly, the present disclosure relates to an apparatus, and an associated methodology, by which to page the mobile station pursuant to a two-stage paging scheme.

Bits that together uniquely identify the mobile station, such as a TMSI (Temporary Mobile Station Identity) address or IMSI (International Mobile Subscriber Identity) address are hashed into paging messages that are sent on first and second paging channels. The hashing of the bits into messages on the separate paging channels is carried out in a manner in which the size of a paging message sent on a second of the paging message channels is of reduced length, permitting the second paging message channel to be used for additional communication purposes.

BACKGROUND OF THE INVENTION

Advancements in communication technologies have been implemented in many varied types of communication systems. Their implementation has permitted the improved communication capacities of existing communication systems and the introduction of communication systems. Cellular, and cellular-like, mobile communication systems are exemplary of communication systems made possible as a result of advancements in communication technologies.

Successive generations of cellular communication systems have been developed and deployed with each generation taking advantage of available communication technologies. While early-generation communication systems provided primarily voice communication services and only limited data communication services, newer-generation systems provide increased data services. Cellular mobile radio communication systems are, as a result, increasingly used, not just for voice services, but also for data communication services.

A user typically communicates by way of a cellular communication system through use of a mobile station. A mobile station is a radio transceiver, typically of dimensions permitting its convenient carriage and operation by the user. The mobile station is powered by a portable power supply that is carried together with, and forms part of, the mobile station. During operation of the mobile station, the stored energy of the portable power supply is depleted, and the power supply must be recharged or replaced once the stored energy is depleted to an extent that limits, or prevents, the continued operation of the mobile station. To increase the operational period of a mobile station, efforts are made to reduce its energy requirements.

Schemes have been developed, relating to monitoring, by a mobile station, for a pending communication service. A mobile station is maintained in a low-power, sometimes referred to as a sleep mode, and the mobile station periodically wakes up to monitor a paging channel to determine whether the mobile station is paged. If the mobile station is not paged, the mobile station returns to a sleep, or other low-power, mode, thereby to minimize power dissipation. The page of the mobile station must appropriately identify the mobile station so that the mobile station is aware that it, and not a different mobile station, is being paged. At least one proposed system provides for a two-stage paging scheme in which two different channels are used to send a page to page a mobile station. The 3GPP (3$^{rd}$ Generation Partnership Project) is considering proposals for a new air interface, referred to as Long Term Evolution (LTE). In the proposed paging scheme, the mobile station, referred to as a UE (User Equipment), wakes up and monitors a first channel. Assignment information, if sent thereon, provides information usable by the UE to then tune to the second paging channel. Proposals provide for the communication on the first paging channel of a group address, referred to as a PI-RNTI. More than one UE might share the same address. Any UE that detects the group address communicated on the first paging channel then also monitors the second paging channel for a page message sent thereon. In one existing proposal, a unique identifier, such as a 32-bit TMSI (Temporary Mobile Station Identity), is sent on the second paging channel to page the mobile station. Because the unique identifier uniquely identifies the UE, only the UE that is intended to be paged is paged by the transmission. The second paging channel is, however, also used for traffic services, such as the communication of voice traffic or data traffic. The use of a lengthy, unique identifier to identify the UE that is paged therefore comes at the expense of capacity on the channel also to be used for a traffic service.

If a manner could be provided by which to reduce the lengths of paging messages sent on the second paging channel, additional system capacity would be made available for communication pursuant to a traffic service.

It is in light of this background information related to paging of a mobile station in a radio communication system that the significant improvements of the present disclosure have evolved.

BRIEF DESCRIPTION OF THE DRAWINGS

FIG. 6 illustrates an exemplary message format of an exemplary message generated pursuant to operation of the radio communication system shown in FIG. 1 of an embodiment of the present disclosure.

FIG. 7 illustrates a representation, similar to that shown in FIG. 6, but of an alternate message generated pursuant to an alternate embodiment of the present disclosure.

FIG. 8 illustrates a representation of another exemplary message generated pursuant to operation of an embodiment of the present disclosure.

DETAILED DESCRIPTION

Figure 1:
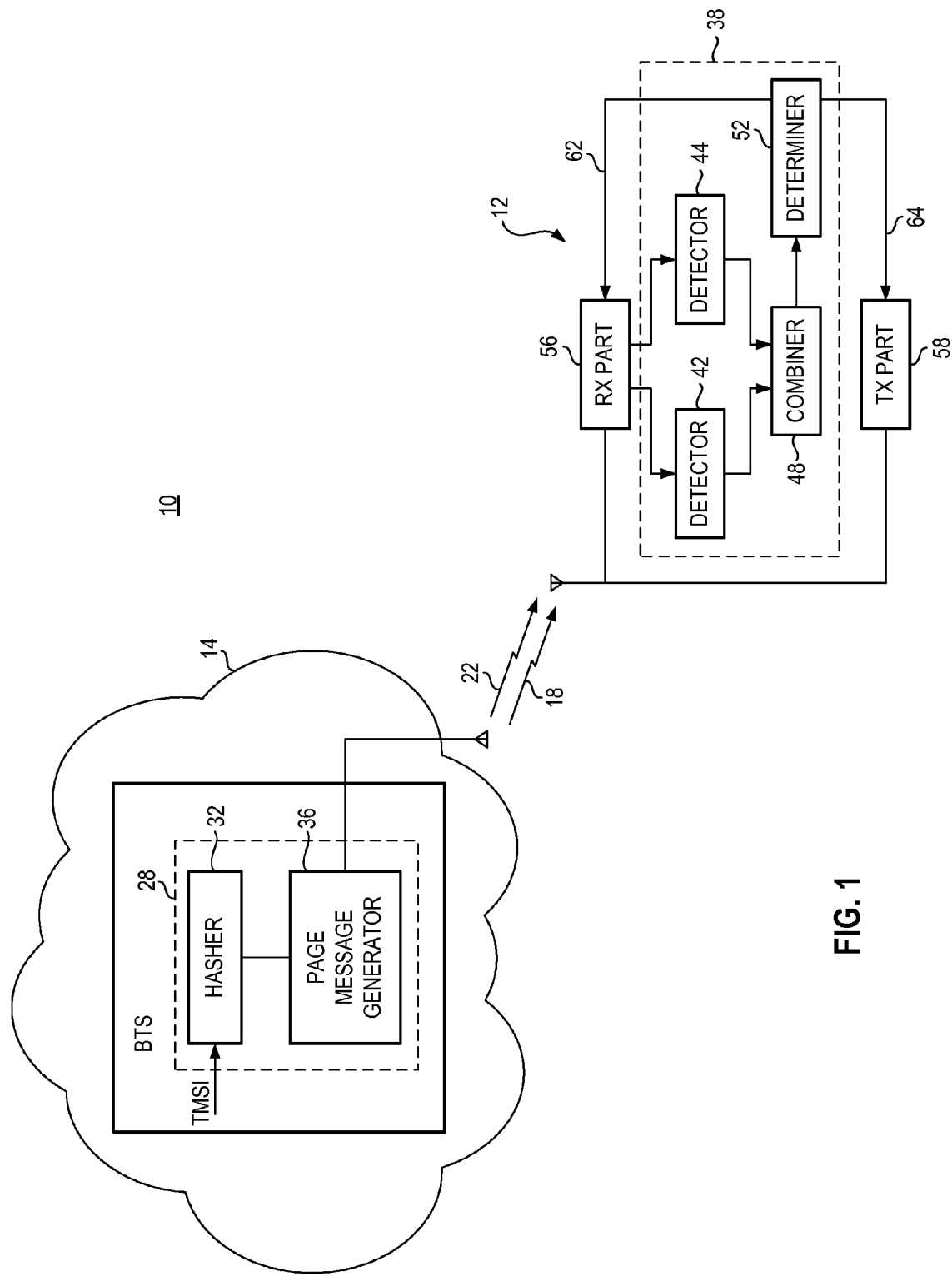
FIG. 1 illustrates a functional block diagram of a radio communication system in which an embodiment of the present disclosure is operable.

The present disclosure, accordingly, advantageously provides apparatus, and an associated methodology, by which to facilitate paging of a mobile station.

Through operation of an embodiment of the present disclosure, a manner is provided by which to page the mobile station pursuant to a two-stage paging scheme.

In one aspect of the present disclosure, the bits that are sent, pursuant to the two-page paging scheme, together include all of the bits that uniquely define the mobile station that is paged. The bits that are sent together define, for instance, a TMSI, an IMSI, or other value that uniquely identifies the mobile station. Thereby, through appropriate recombination of the bits that are sent pursuant to the two-stage paging scheme, the mobile station is able to recreate the unique identifier that is sent and to determine whether the mobile station is paged.

In another aspect of the present disclosure, the unique identifier that uniquely identifies a mobile station that is to be paged is hashed to hash a first group of bits of the identifier to a first paging message and to hash a second group of the bits of the identifier to a second paging message. Multiple noncontiguous portions of the identifier are hashed to form the separate paging messages. Because noncontiguous portions of the unique identifier are used in the hashing, problems that might otherwise result from the use of contiguously-positioned bits of the unique identifier are avoided.

In another aspect of the present disclosure, when implemented in a 3GPP LTE system, the hashings that form the first group of hashed bits form a group address, a PI-RNTI value. And, the hashed bits that form the second group form a short address. The group address is sent on a first channel, e.g., a DL-CCH (Down Link Control Channel), and the second group is sent on a PCH (Paging Channel). The first group and the second group together comprise all of the unique identifiers that uniquely identify the mobile station. If the unique identifier is 32 bits, e.g., the first group comprises, e.g., 16 bits, and the second group comprises the remaining 16 bits.

In another aspect of the present disclosure, the hashing of the unique identifier of the mobile station is performed to create three groups of the bits hashed from the identifier. A first group of hashed bits forms the group address, a second group forms a short address, and a third group forms a third address. The number of hashed bits of the three groups together correspond to the bits of the unique identifier.

In another aspect of the present disclosure, a single group address is used for all mobile stations. And, the group address is set to a value that is the same for all individually directed pages, e.g., the group address is set to be 0xffff. The unique identifier of the mobile station is hashed to form a first short address and a second address.

In another aspect of the present disclosure, the mobile station wakes up to detect whether the group address associated therewith is sent on a first paging channel, such as a DL-CCH. And, the mobile station further monitors the second paging channel to detect whether a short address is communicated thereto.

In another aspect of the present invention, the mobile station combines the bits detected on the two paging channels and determines whether the mobile station has been paged by determining whether the combined bits correspond to the bits of the unique identifier of the mobile station.

Because fewer than all of the bits of the unique identifier are sent on the second paging channel, additional capacity is provided on the second paging channel for the performance of traffic communication services. Improved efficiency of use of spectrum allocated to the communication system.

In these and other aspects, therefore, an apparatus, and an associated methodology, is provided for facilitating mobile-station paging upon a first paging channel and a second paging channel. A hasher is configured to hash a unique mobile station identifier into a first group of bits and a second group of bits. A page message generator is configured to generate a first page message that contains the first group of bits on the first paging channel and to generate a second page message that contains the second group of bits on the second paging channel.

Referring first, therefore, to FIG. 1, a radio communication system, shown generally at 10, provides for radio communications with mobile stations, of which the mobile station 12 is representative. The communication system, in the exemplary implementation, forms a 3GPP ($3^{rd}$ Generation Partnership Project) LTE (Long Term Evolution) system that provides for both voice and data communication services by, and with, mobile stations, such as the mobile station 12. When a communication service is to be established with a mobile station, the mobile station is paged in order to alert the mobile station of the pending communication service and thereby to permit the mobile station to take further action to accept the communication service and enter into a state to permit its delivery or performance. As mentioned previously, a two-stage paging method is to be provided. That is to say, when paging a mobile station, hereinafter referred to as a UE (User Equipment) the infrastructure uses two different channels to send a page. Page messages, originated at the network 14, are sent upon channels defined upon a radio air interface that extends beyond the network 14 and the mobile stations. While the following description shall describe exemplary operation in which the communication system forms a 3GPP LTE system, the teachings set forth herein are analogously implementable in other types of communication systems.

Pursuant to paging in the 3GPP LTE—compliant system, the UE is assigned to a certain paging occasion within a DRX (Discontinuous Reception) cycle. The UE 12 wakes up and turns on its receiver and first receives a control channel, referred to as an L1/L2 control channel, a PD-CCH (Physical Downlink Control Channel), or a Downlink Control Channel (DL-CCH). The DL-CCH includes resource block assignment information. The resource block assignment includes, e.g., information such as the frequency and time to indicate to the UE in what manner to receive the associated paging message. Then, the paging message is sent on a PCH (Paging Channel) transport channel. The PCH transport channel is mapped to a PDSCH (Physical Downlink Shared Channel) physical channel.

A group address is used on the DL-CCH. The group address is sometimes referred to as a PI-RNTI. When paging a UE, the network is aware of the PI-RNTI of the UE that is to be paged, and the network uses the address to form the content of the DL-CCH message. In 3GPP specification number 36.212v200, a 16-bit cyclic redundancy check (CRC) is used for error detection of the DL-CCH. This section also specifies that, for the DL-CCH message, an exclusive OR operation is performed on the computed CRC, and an identity, i.e., the PI-RNTI. The result of the exclusive OR operation is appended to the payload. Then both the PI-RNTI and the result of the exclusive OR operation are sent on the DL-CCH. Due to the exclusive OR operation, a UE that receives the transmitted message is not able to decode the content that is intended for another UE that has another PI-RNTI.

The DL-CCH is represented by the arrow 18, and the PCH is represented by the arrow 22. The channels are defined upon the radio air interface and are monitored by the UE 12 in manners as noted above. As also noted above, the PCH is also used for traffic services to communicate voice and data traffic. An embodiment of the present disclosure provides a manner by which to increase the portion of the PCH that is available for communication of traffic data.

An apparatus 28 is embodied at a network entity, here a base transceiver station 34 and operates pursuant to paging of a UE, here the UE 12. The apparatus 28 includes a hasher 32 and a page message generator 36. The elements 32 and 36 are functionally represented, implementable in any desired manner, including algorithms executable by processing circuitry. And, while the apparatus is here shown to be embodied at a single network entity, in other representations, the elements are distributed amongst more than one entity.

When a communication service is to be performed with the UE 12, its unique identifier, here a TMSI, a 32-bit value, that uniquely identifies the UE is provided to the hasher 32. The hasher 32 operates to hash the bits of the TMSI, or other unique identifier, into groups of hashed bits. The groups of hashed bits are provided to the page message generator 36. The page message generator 36 forms a first message for transmission upon the DL-CCH and, thereafter, a second message that is sent upon the PCH. The hashing is performed in a manner such that, collectively, all of the bits of the TMSI, or other unique identifier, are used in the first and second page messages.

The UE 12 includes further apparatus, shown at 38 of an embodiment of the present disclosure. The apparatus 38 is also functionally represented, formed of entities implementable in any desired manner, including by algorithms executable by processing circuitry. The apparatus includes a first detector 42, a second detector 44, a combiner 48, and a determiner 52. The UE is further shown to include transceiver circuitry, here represented by a receive (RX) part 56 and a transmit (TX) part 58.

The first detector 42 operates to detect a page message sent on the first paging channel, here the DL-CCH 18. When a page message is sent on the DL-CCH 18 and delivered to the mobile station 12, the detector 42 detects its contents, provides the detected contents to the combiner 48, and provides an indication to the detector 44 to monitor for the communication of a page message on the paging channel 22. When a paging message is subsequently sent on the paging channel and delivered to the mobile station, the detector detects its delivery and provides the detected contents of the page message to the combiner 48.

The combiner operates to combine the bits provided thereto by the detectors 42 and 44. If the combination corresponds with the unique identifier of the mobile station, a determination is made by the determiner that the mobile station is being paged. In another implementation, the bits are not combined but, rather, are compared with corresponding values of the unique identifier. Lines 62 and 64 extending to the receive and transmit parts, respectively, of the mobile station, alert the transceiver circuitry to enter into a state pursuant to performance of the communication service.

Figure 2:
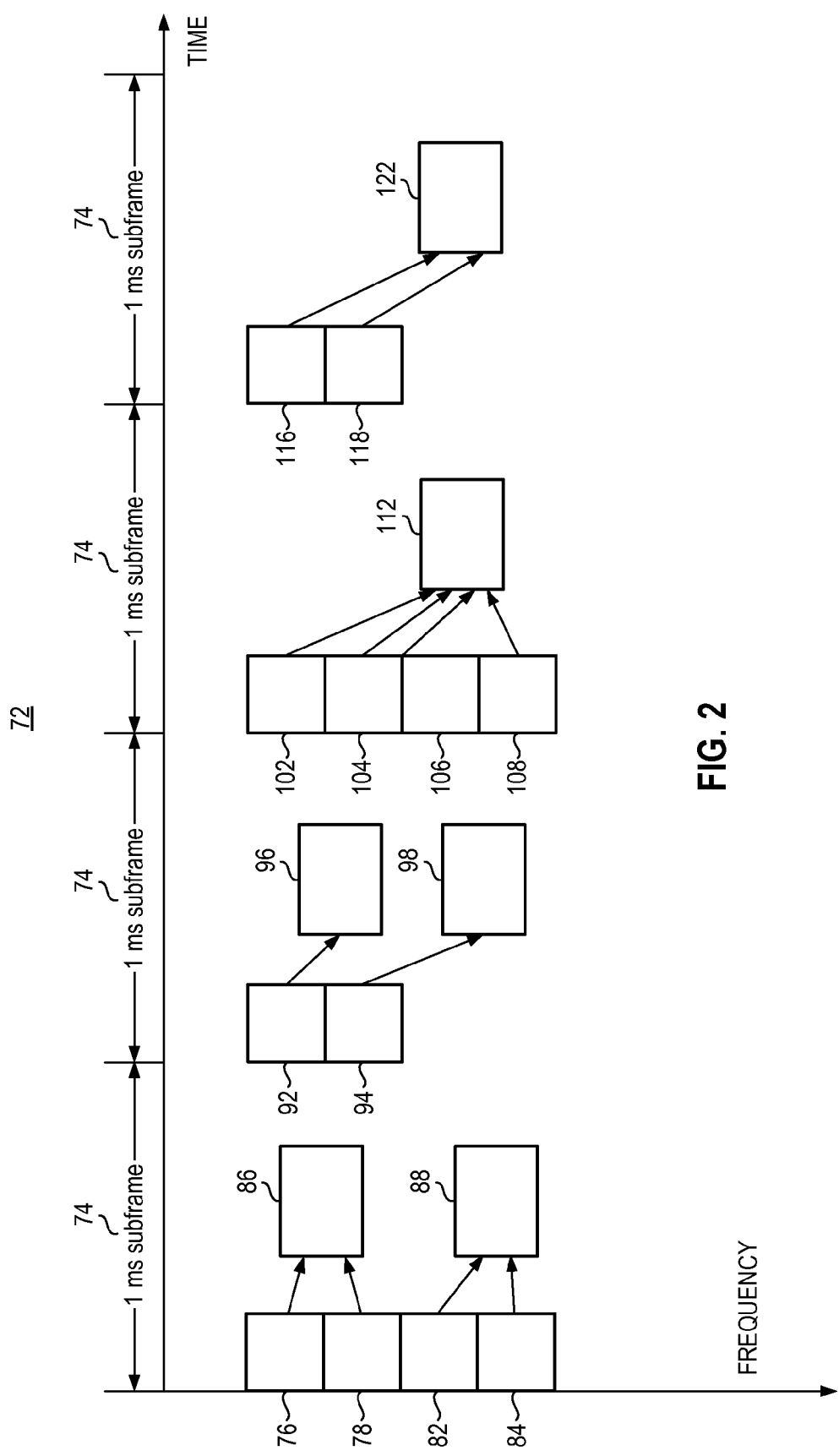
FIG. 2 illustrates a representation of an exemplary allocation of first and second paging channels during four successive sub frame time periods.

FIG. 2 illustrates a representation, shown generally at 72, of exemplary paging in a 3GPP LTE radio air interface. Here, the first four 1 ms sub frames 74 of a 10 ms frame are shown. Each sub frame 74 includes multiple DL-CCH channels, and messages sent thereon, followed by one or more pages generated on one or more paging channels.

In the first sub frame, four DL-CCHs 76, 78, 82 and 84 are shown. Each of the DL-CCHs is defined upon different OFDM sub carrier frequencies. The channels 76 and 78 here send assignment information that direct UEs to receiver their pages in a first PCH page message 86. The channels 82 and 84 here send assignment information directing UEs to receive their pages sent on a second PCH 88. Messages sent on the channels 86 and 88 are transmitted using different OFDM sub carrier frequencies.

The second sub frame 74 illustrates DL-CCHs 92 and 94. Messages generated on each of these two channels are transmitted using different OFDM sub carrier frequencies. The channel 92 has assignment information that directs a UE to receive its page on the PCH 96. The channel 94 has assignment information that directs a UE to receive its page on the PCH 98. The page messages 96 and 98 are transmitted using different OFDM sub carrier frequencies. A page message sent on the channel 96 is sent on a different set of OFDM sub carrier frequencies than those used by the channel 92. Likewise, the page message sent on the channel 98 is sent on a different set of OFDM sub carrier frequencies than the frequencies used by the channel 94.

The third sub frame 74 shows four DL-CCHs, 102, 104, 106, and 108. Each of the four channels is defined upon different OFDM sub carrier frequencies. Messages sent thereon all have assignment information directing UEs to receive their pages on a paging channel 112. The page message sent on the paging channel 112 is sent on a different set of sub carrier frequencies than those upon which any of the channels 102-108 are defined.

In the fourth sub frame 74, two DL-CCHs 116 and 118 are defined. Messages broadcast thereon both have assignment information directing UEs to receive their pages on a paging channel 122. The page message sent on the paging channel 122 is sent on a different set of sub carrier frequencies than those that define either of the channels 116 or 118.

Figure 3:
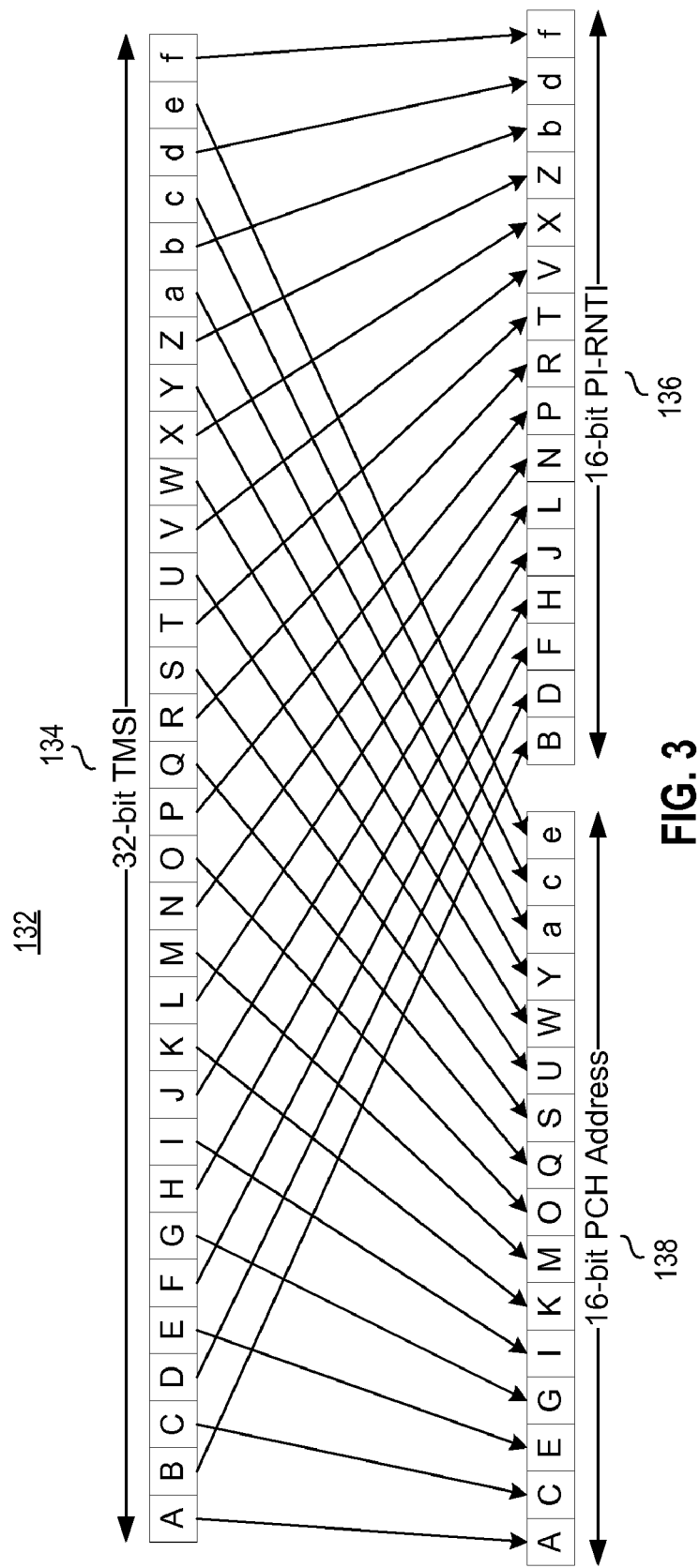
FIG. 3 illustrates exemplary hashing performed during operation of an embodiment of the present disclosure.

FIG. 3 illustrates a representation 132 representative of exemplary hashing performed pursuant to an embodiment of the present disclosure. Here, a 32-bit TMSI address 134 is hashed into two groups of hashed values 136 and 138. The first group 136 defines a 16-bit PI-RNTI value, and the second group 138 defines a 16-bit PCH address. The PCH address is a short address that is used as a PCH page message. Hashing is performed to page the UE that is associated with the unique identifier 134. In the scheme represented in FIG. 3, all of the bits of the TMSI are divided between the groups 136 and 138 such that all of the TMSI bits are used for paging. The PI-RNTI 136 is formed of 16 of the TMSI bits. In other implementation, the PI-RNTI, or equivalent, is of other lengths, e.g., 14 bits, 12 bits, etc. And, an address to be used on the PCH is formed of the other 16 of the TMSI bits.

TMSI assignment is performed by a core network, and the radio access network portion of the network does not have control over the TMSI assignment procedure. If the core network assigned TMSIs that were random in all 32 bits, then the mapping of the 32 TMSI bits to the groups 136 and 138 would not require hashing. If, for example, the PI-RNTI could be set to the most significant bits of the TMSI, and the 16 bit short page address was set to the least significant bits of the TMSI, the randomness would carry over to the groups of bits. However, the bits of the TMSI may not be randomly assigned. According to a simple TMSI assignment procedure, the core network could simply assign TMSIs sequentially. In this scenario, if there were a number of UEs then all UEs would have the same PI-RNTI values, thus forcing all UEs monitoring a sub frame to monitor all PCH page messages. Battery life of the UE would be reduced.

Hashing in accordance to the representation 132 avoids this problem by assigning the PI-RNTI such that it is not simply a contiguous portion of the TMSI, and likewise assigning the short page address such that it is not simply a contiguous portion of the TMSI. The PI-RNTI is set, as shown, to the concatenation of multiple non-contiguous portions of the TMSI. Likewise, the short page address 138 is set to the concatenation of multiple non-contiguous portions of the TMSI. In this scheme, the multiple non-contiguous portions of the TMSI used to form the PI-RNTI and the short page address are all one-bit, non-contiguous portions. Alternately, some or all of the non-contiguous portions could be multi-bit, non-contiguous portions. As illustrated, the TMSI is formed of 32 bits A-f. A is the most significant bit and f is the least significant bit. The PI-RNTI 136 is formed by concatenating the even bits B . . . f of the TMSI together. The short page address 138 is formed by concatenating the odd bits A . . . e of the TMSI together. Many variations of the scheme shown in the representation 132 are, of course, possible.

One of the benefits provided by the scheme of the representation 132 is that all bits of the unique identifier are together used on the DL-CCH and the PCH. Some of the address bits are used on the DL-CCH and remaining ones of the address bits are used on the PCH. By using all of the bits to page the UE rather than a subset of the bits, any issues associated with having two UEs responding to the same page are avoided.

It should be noted that, while the exemplary representation utilizes a TMSI, in other implementations, other identifiers are used, e.g., an IMSI address or a hardware identifier. In one implementation the infrastructure and UE could use a first type of address such as an IMEI on both the DL-CCH and the PCH if there is no TMSI assigned to the UE; the infrastructure and the UE would then use a second type of address such as a TMSI on both the DL-CCH and the PCH if a TMSI is assigned to the UE.

Figure 4:
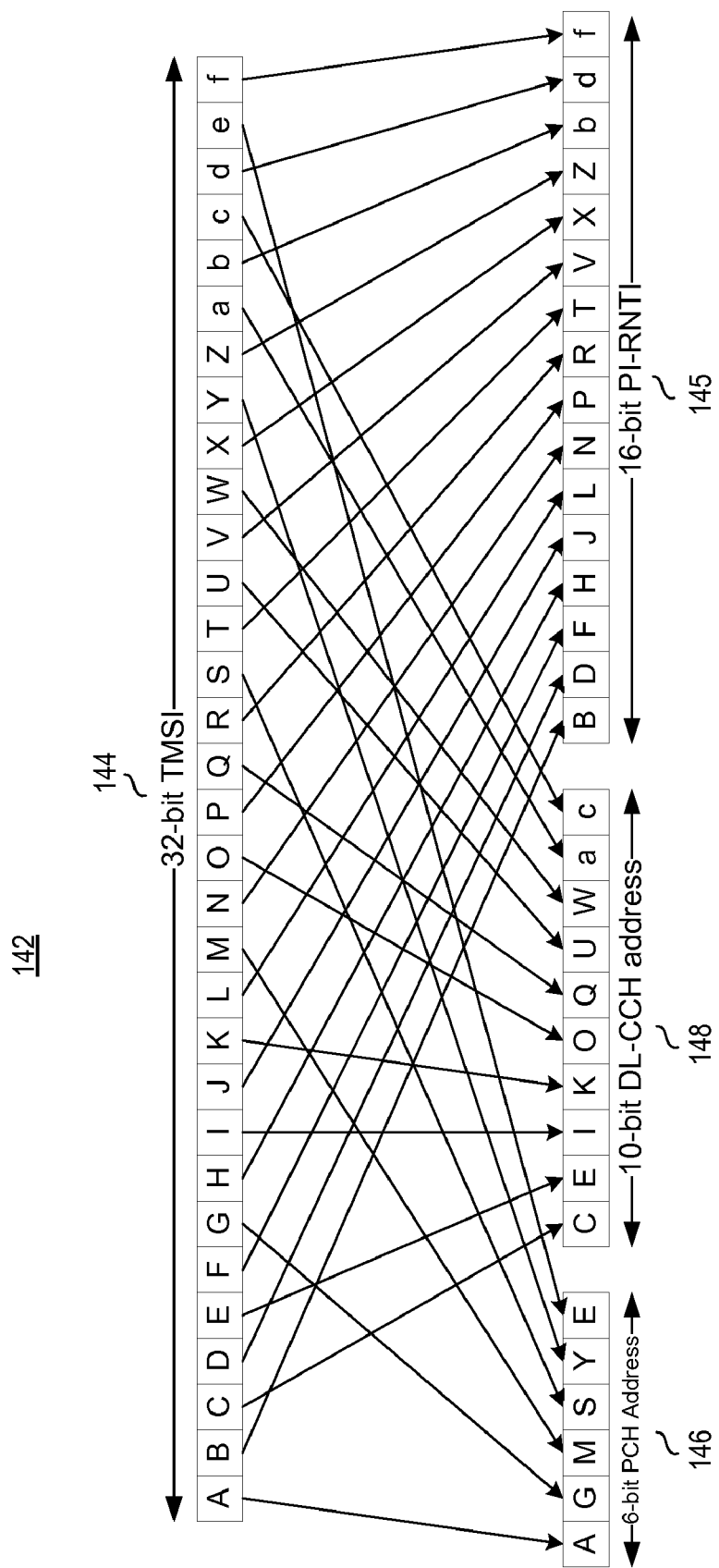
FIG. 4 illustrates a representation, similar to that shown in FIG. 3, but here showing alternate hashing performed pursuant to operation of an alternate embodiment of the present disclosure.

FIG. 4 illustrates a representation 142 of another hashing scheme utilized pursuant to an embodiment of the present disclosure. Here, the 32-bit TMSI, or other unique identifier, 144 of a UE is hashed into three groups, a first hashed group 145, a second hashed group 146, and a third hashed group 148. The first group 145 again forms a 16-bit PI-RNTI. The second group 146 forms a 6-bit short address to be used in a PCH page message. And, the third group 148 forms a 10-bit DL-CCH address. In 3GPP, the final format for the DL-CCH is not yet formulated. However, it appears that, when used for paging, there may be as many as 11 bits from the DL-CCH payload that would be unused. It is contemplated that currently unused bits are able to be allocated to carry additional address bits in order to further reduce the size of the address used on the PCH and, thus, further save capacity on the PDSCH. When a UE receives the DL-CCH and the CRC check passes, then the UE determines that the message is being sent, addressed to the PI-RNTI of the UE. The UE then compares the received DL-CCH address to its own DL-CCH address. If the two match, then the UE attempts to receive a PCH page message based upon the received assignment information. It should be noted that, adding more address bits in addition to the PI-RNTI to the DL-CCH, the probability that a UE shall receive the PCH page message in response to another UE being paged is reduced. Considerably more energy is required to receive a PCH message, thus this implementation provides battery savings. The hashing mechanism set forth in FIG. 4 is performed by the network part in order to page a UE. Analogous hashing is performed at the UE in order to receive a page. The hashing mechanism set forth in FIG. 4 divides all of the bits of the TMSI between the DL-CCH and the PCH page message such that all of the TMSI bits are used for paging. The PI-RNTI is formed from 16 of the TMSI bits. The DL-CCH address is formed another 10 bits of the TMSI. And an address to be used on the PCH is formed of the other 6 bits of the TMSI bits.

Although the scheme set forth in FIG. 4 shows that the short PCH address is six bits and that the DL-CCH address is ten bits, it should be noted that other bit lengths could be used for the DL-CCH address and for the short PCH page address.

In the event that there are fewer unused bits available for paging on the DL-CCH than currently anticipated, then the DL-CCH address can be shortened and the short PCH address can correspondingly be lengthened. Alternatives include, e.g., a 7-bit, short PCH address with a 9-bit DL-CCH address, an 8-bit short PCH address with an 8-bit DL-CCH address, a 9-bit short PCH address with a 7-bit DL-CCH address, an 10-bit short PCH address, with a 6-bit DL-CCH address, etc. Various combinations are used with the entire TMSI used for paging the UE on the DL-CCH and the PCH.

In the scheme set forth in FIG. 4, the PI-RNTI is assigned such that it is not simply a contiguous portion of the TMSI. And the DL-CCH address is also assigned in a manner such that it is not simply a contiguous portion of the TMSI. And, also, the short page address is assigned such that it also is not a simply contiguous portion of the TMSI. Each of the groups of bits is set to the concatenation of multiple non-contiguous portions of the TMSI. In the scheme shown in FIG. 4, all of the hashing is of 1-bit, non-contiguous portions. In alternate schemes, some, or all, of the non-contiguous portions are instead multi-bit, non-contiguous portions. Here, the PI-RNTI is formed by concatenating the even bits of the TMSI together. The DL-CCH address is formed by concatenating a first group of odd bits and the short page address is formed by concatenating a second group of odd bits together. Many variations of the scheme shown by the representation 142 are possible.

A benefit associated with the hashing scheme of the representation 142 is that all bits of the address 144 are used on the DL-CCH and the PCH. Some of the address bits are used on the DL-CCH, and the remaining address bits are sent on the PCH. By using all of the bits to page the UE instead of a subset of the bits, any issues associated with having two UEs respond to the same page are avoided.

Here, again, while a TMSI address forms the identifier 144 in the exemplary implementation, in other implementations, other unique identifiers, such as an IMSI or a hardware identifier are instead used. Again, in one implementation the infrastructure and UE could a first type of address such as an IMEI on both the DL-CCH and the PCH if there is no TMSI assigned to the UE; the infrastructure and the UE would then use a second type of address such as a TMSI on both the DL-CCH and the PCH if a TMSI is assigned to the UE.

Figure 5:
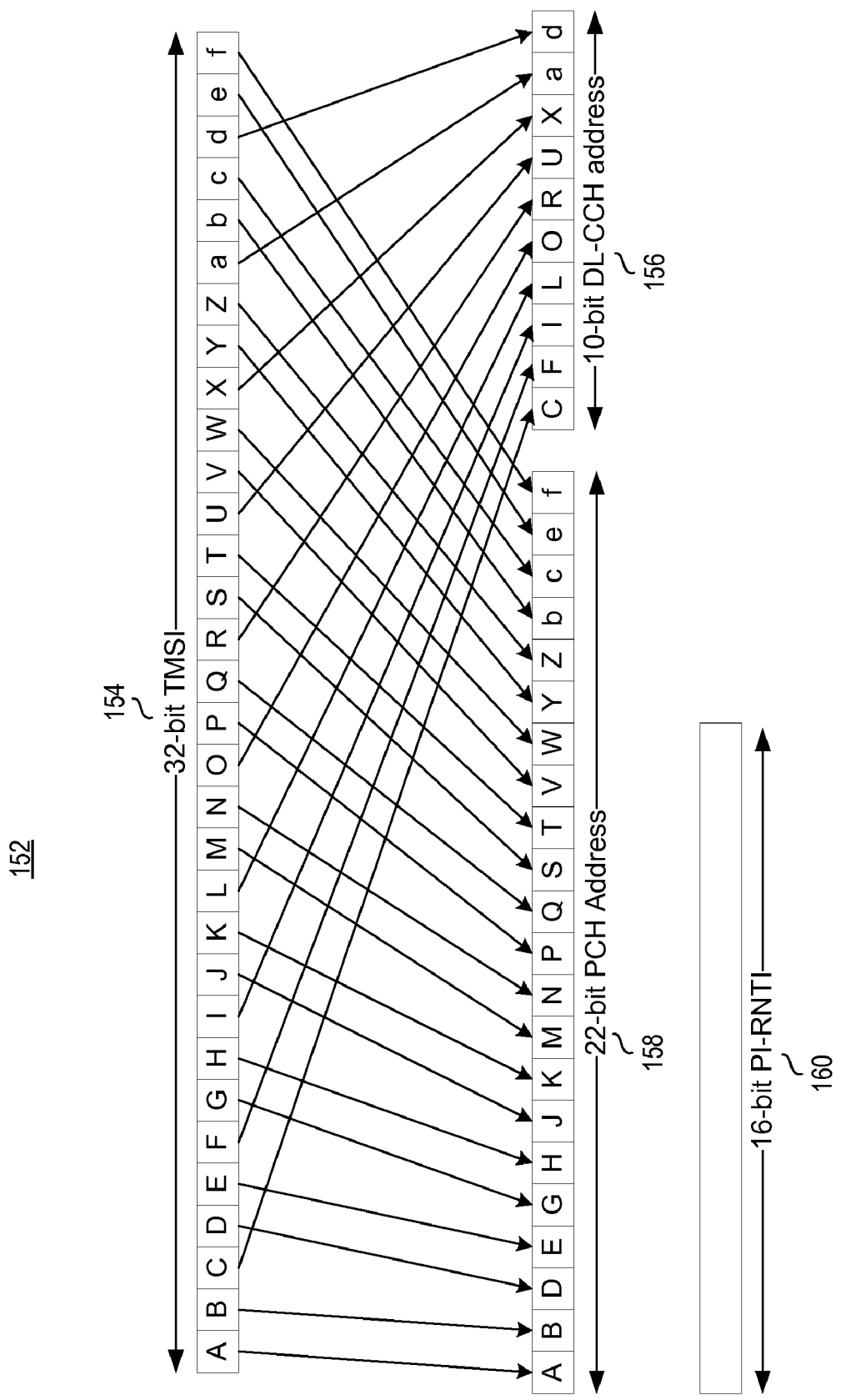
FIG. 5 illustrates another representation, similar to those shown in FIGS. 3-4, but representative of alternate hashing performed pursuant to another alternate embodiment of the present disclosure.

FIG. 5 illustrates a representation 152 of another hashing scheme used pursuant to operation of another embodiment of the present disclosure. Here, again a 32-bit TMSI 154 is hashed into a first group of hashed bits 156 and a second group of hashed bits 158. In this scenario, it is assumed that a single PI-RNTI value 160 is used for individually directed pages to all UEs. That is to say, the same PI-RNTI 160 is used to page all UEs. The PI-RNTI 160 is set to a value, such as, e.g., 0xffff or any other value. As the PI-RNTI is set to a fixed value for all individually directed pages, the PI-RNTI is not used to convey address bits of the unique identifier of a UE. The scheme set forth in FIG. 5 shows an example of a manner by which to hash a 32-bit TMSI address 154 to a 22-bit short address 158 to be used in the PCH page message, and a 10-bit, DL-CCH address 156. When a UE receives the DL-CCH-sent message, and the CRC check passes with the PI-RNTI 160, the UE determines that the DL-CCH message is part of an individually-directed page. The UE then compares the received DL-CCH address to its own DL-CCH address. If the two match, then the UE attempts to receive a PCH page message based upon the received assignment information. The hashing mechanism represented in FIG. 5 is performed at the network and a corresponding hashing procedure is performed at the UE. Again, all of the bits of the TMSI 154 are included, collectively, in the group 156 and group 158. Again, while, in the exemplary implementation, the first group 156 is of a 10-bit length and the second group 158 is of 22-bit length, in other implementations, the addresses 156 and 158 are formed of other lengths, analogous to the scenario set forth above with respect to FIGS. 3 and 4. Additionally, again, the hashing is performed in a manner such that multiple, non-contiguous portions of the TMSI are hashed and concatenated together. In other implementations, multiple, non-contiguous portions of the TMSI are used to form the first and second groups 156 and 158. And, again, in other implementations, other values, other than the TMSI, such an IMSI or other hardware identifier, is instead utilized and hashed. Again, in one implementation the infrastructure and UE could a first type of address such as an IMEI on both the DL-CCH and the PCH if there is no TMSI assigned to the UE; the infrastructure and the UE would then use a second type of address such as a TMSI on both the DL-CCH and the PCH if a TMSI is assigned to the UE.

FIG. 6 illustrates an exemplary DL-CCH message, shown as 168, used for an individually directed page. The message includes a PCH assignment information field 172, a PI-RNTI adjusted field 174, an other information field 176, and an error detecting code field 178.

The PCH assignment information field 172 includes information to direct a UE how to receive a PCH message. For example, with respect to the example shown in FIG. 2, the information in the PCH assignment information field of the channel 76 informs the UE of the PCH page 86. The information in the PCH assignment information field 172 would indicate which OFDM sub carrier frequencies are used for the PCH page. Additional information includes, e.g., items such as a time offset until the beginning of the PCH page or a timed duration of the PCH page. The field 174 indicates to the UE whether the PI-RNTI of the UE is adjusted in order to avoid a collision with a reserved PI-RNTI. The field 174 is used, e.g., to ensure that the UE is uniquely addressed. Alternately, the PI-RNTI adjusted field 174 is omitted if it is not imperative that the UE be addressed uniquely. The field 176 includes other information and consists, e.g., of reserved bits. The error detecting field 178 is set to the PI-RNTI exclusive-ORed with a CRC computed over the fields of the message.

FIG. 7 illustrates another exemplary DL-CCH message, shown at 182, used for an individually-directed page. The message includes a PCH assignment information field 184, a PI-RNTI adjusted field 186, a 10-bit DL-CCH address field 188, and an error detecting code field 192. The fields 184-192 are analogous to those set forth above with respect to the message 168 shown in FIG. 6.

The field 188 is used to carry more bits of the UE address and corresponds to the address 148 shown in FIG. 4. Different types of hashing, other than those set forth in FIG. 4 can be used to form the values of the field. And, lengths other than 10 bits can also be used.

FIG. 8 illustrates portion 196 of an exemplary PCH message that is used to page two UEs. Fields present in an actual page message, such as header bits, a message ID, and an error detecting code are not shown. The PCH page message is used to page at least one UE and can be used to page two or more UEs by including multiple page records in the message. The example shown in FIG. 8 shows two page records. The first page record comprises an address format field 198, an address field 202, and a page info field 204. The second page record comprises an address format field 206, and address field 208, and a page info field 212.

The address format field 198 includes information about the address field 202. The address format field 198 is indicative of the length of the address field 202. In one embodiment, the address format field may also, specify the type of address if multiple types of address are used for paging. Possible address types include, e.g., a TMSI, an IMSI, and a hardware identifier. Alternately, the type of address could be specified by another field if multiple address types were supported. The address format field 198 may be a single-bit field if there is only one type of address possible and only two possible lengths. Alternately, the address format field may be a multi-bit field. The address field 202 includes either the UE identity or a hashed portion of the UE identity.

The page info field 204 includes information about the page. This information is, for example, the service that is causing the UE to be paged. Knowing the service that caused the page can help the UE to request set up of the appropriate resources when the UE responds to the page. The page info field 204 may also include other information. The fields 206-212 are analogous to the fields 198-204.

Figure 9:
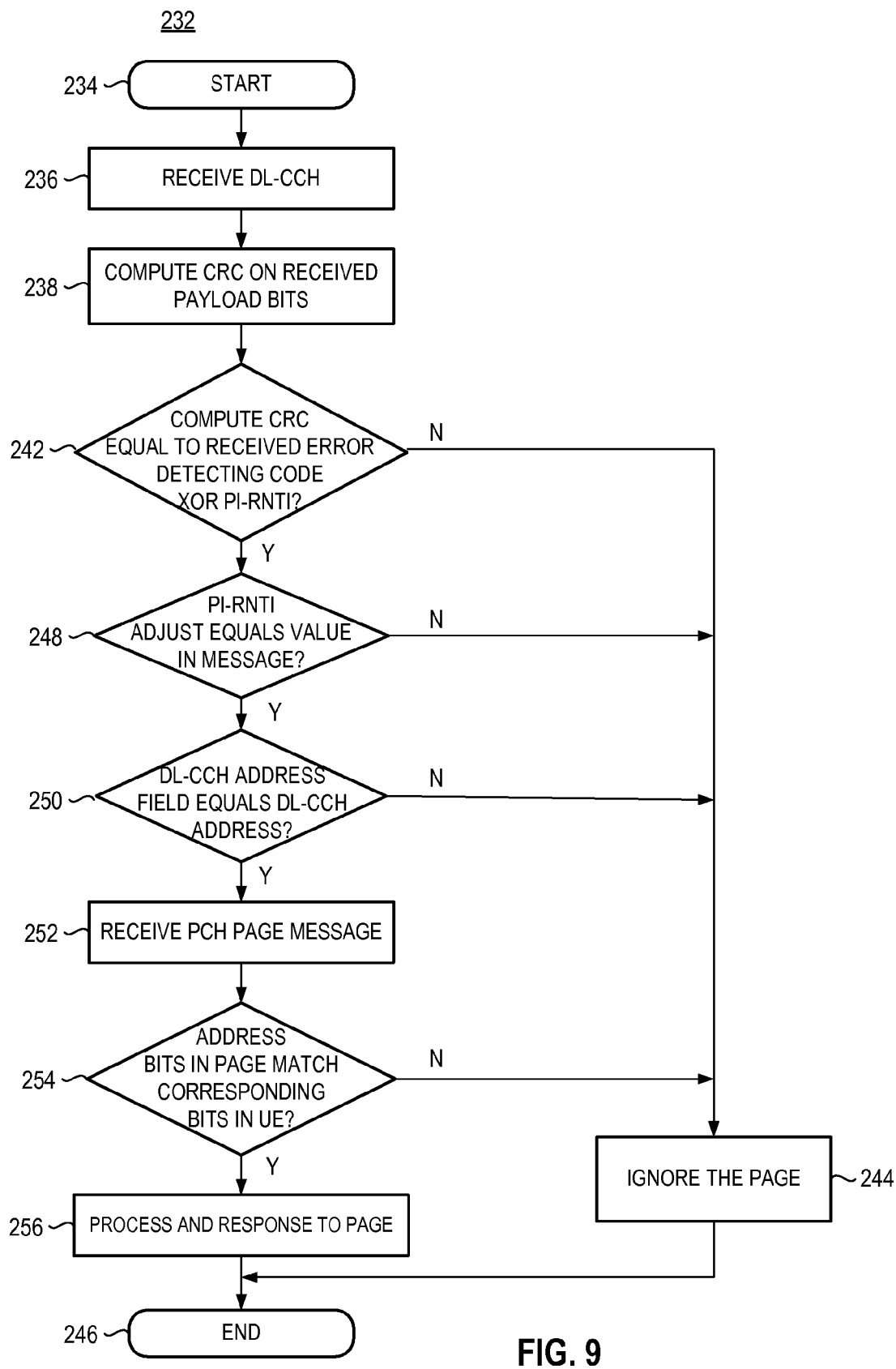
FIG. 9 illustrates a process diagram representative of the process of an exemplary embodiment of the present disclosure.

FIG. 9 illustrates a procedure 232 of an embodiment of the present disclosure by which a UE receives a page. Subsequent to the start at the start block 234, the UE receives, indicated by the block 236, a DL-CCH message sent on a DL-CCH. As indicated by the block 238, the UE computes a CRC on the received DL-CCH payload bits. Exemplary payload bits are shown in the example message 182 shown in FIG. 7.

Processing continues, and a determination is made at the decision block 242 at which the UE compares the computed CRC with the received error detecting code, such as represented by the field 192 shown in FIG. 7, exclusive-ORed with the PI-RNTI of the UE. If the result of the decision 242 is negative, processing continues at the block 244 where the UE ignores the page and then ends at the block 246.

If, conversely, the result of the operation 242 is positive, the yes branch is taken to the block 248. If there is no PI-RNTI adjusted field, then the operation 248 is not required. And, processing, instead, continues at the decision block 250 rather than the decision block 248.

At the step 248, the UE compares the PI-RNTI adjusted field from the message with its own value. If the result of the determination is negative, a path is taken to the block 244 where the UE ignores the page and then ends at the end block 246.

If, conversely, a positive determination is made at the decision block 248, processing continues at the decision block 250. The operation 250 is optional if a DL-CCH address field is not included. If a DL-CCH address is not included, processing continues at the block 252 rather than at the decision block 250. At the step 250, the UE compares the DL-CCH address field from the message with its DL-CCH address. If the result of the comparison is negative, processing continues at the block 244. Conversely, if the result of the operation 250 is positive, processing continues at the block 252. At the function 252, the UE receives the PCH page message to which it is directed by the DL-CCH. After the step 252, processing continues at the decision block 254.

At the decision block 254, the UE compares its own address bits to address bits from records of the page message. The UE determines there to be a match if one of the address fields is the same as the UE's corresponding bits. If the result of the comparison is negative, the no branch is taken to the block 244. Otherwise, if the comparison is positive, processing continues at the block 256 where the UE processes and responds to the page record of the message that had the matching address bits. Processing ends at the end block 246.

Figure 10:
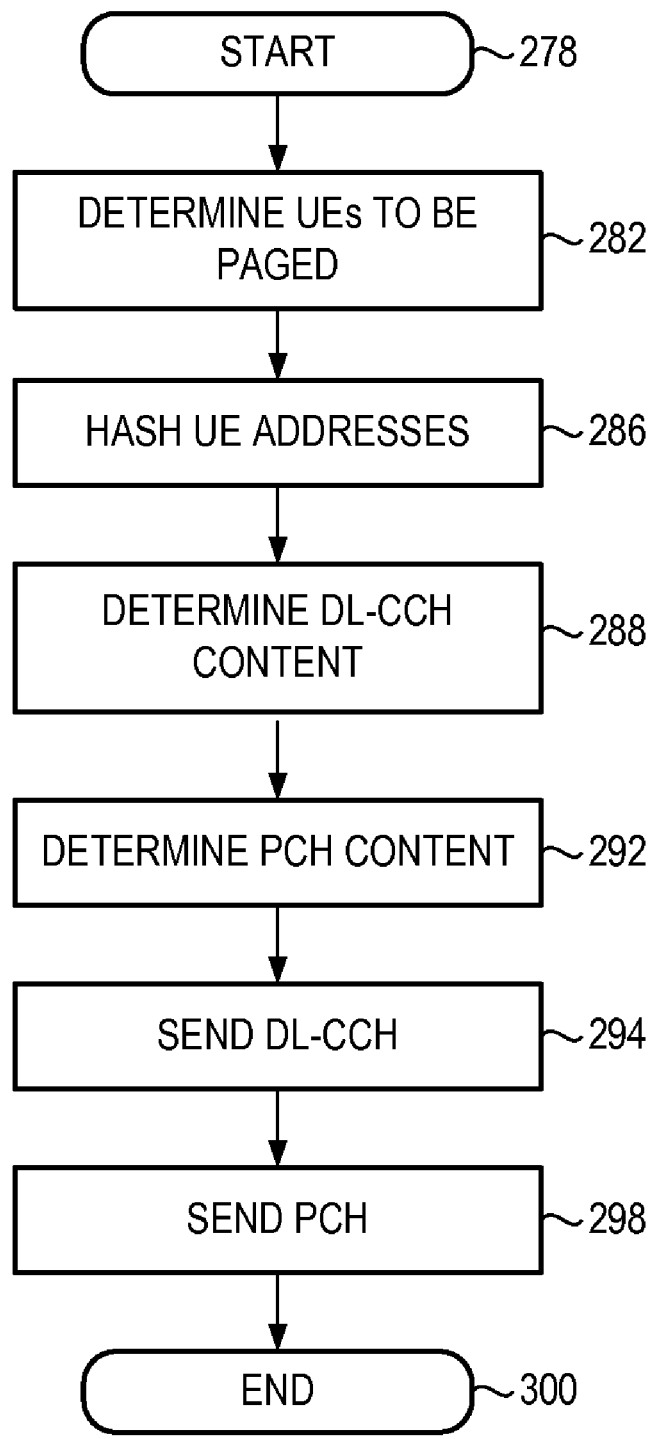
FIG. 10 illustrates a message sequence diagram representative of the method of operation of an embodiment of the present disclosure.

FIG. 10 illustrates a method flow diagram, shown generally at 276, representative of the method of operation of an embodiment of the present disclosure. The method provides a procedure to send pages in a frame. The procedure starts at the start block 278.

At the block 282, the infrastructure determines the UEs to be paged. The UE is paged, e.g., to inform the UE of an incoming phone call or in order to deliver data to the UE pursuant to a data communication service.

Thereafter, and as indicated by the block 286, the addresses of the UE that is being paged is hashed. If more than one UE is paged, each of the addresses of each of the UEs is hashed. In one implementation, hashes are performed at an earlier time and the hashed values are stored in subsequently retrieved in substitution for the hashing of the operation 286. Then, and as indicated by the block 288, a determination is made that the DL-CCH content of the DL-CCHs in the frame. And, as indicated by the block 292, a determination is made of the PCH content.

Then, as indicated by the block 294, the DL-CCH is sent. And, as indicated by the block 298, the PCH is sent. The operations 288-298 are repeated if there are so many pages that multiple sub frames of a frame are required for the pages. Subsequent to the operation 298, the process ends, indicated by the end block 300.

Presently preferred embodiments of the disclosure and many of its improvements and advantages have been described with a degree of particularity. The description is of preferred examples of implementing the disclosure, and the description of preferred examples is not necessarily intended to limit the scope of the disclosure. The scope of the disclosure is defined by the following claims.

What is claimed is:

1. An apparatus for facilitating mobile-station paging upon a first paging channel and a second paging channel to alert a mobile-station to enter into a state pursuant to performance of a communication service, said apparatus comprising:
   a hasher configured to assign bits of a unique mobile station identifier into a first group of bits and a second group of bits, in which at least one of the first group of bits and the second group of bits is assigned by concatenating multiple non-contiguous portions of the unique mobile station identification; and
   a page message generator configured to generate a first page message that contains the first group of bits on the first paging channel and to generate a second page message that contains the second group of bits on the second paging channel, the first group of bits and the second group of bits together comprise all bits of the unique mobile station identifier.

2. The apparatus of claim 1 wherein the multiple non-contiguous portions of the unique mobile station identifier comprise one-bit non-contiguous portions.

3. The apparatus of claim 1 wherein the multiple non-contiguous portions of the unique mobile station identifier comprise multiple-bit non-contiguous portions.

4. The apparatus of claim 1 wherein the first group of bits comprises a first subgroup of the first group and a second subgroup of the first group.

5. The apparatus of claim 4 wherein the first subgroup comprises first non-contiguous portions of the unique mobile station identifier and wherein the second subgroup comprises second non-contiguous portions of the unique mobile station identifier.

6. The apparatus of claim 4 wherein the first subgroup comprises a group identifier and wherein the second subgroup comprises a first paging channel address.

7. The apparatus of claim 1 wherein the first group of bits forms a first address.

8. The apparatus of claim 7 wherein the second group of bits comprises a second address.

9. A method for facilitating mobile-station paging upon a first paging channel and a second paging channel to alert a mobile-station to enter into a state pursuant to performance of a communication service, said method comprising:
   hashing a unique mobile station identifier into a first group of bits and a second group of bits, in which at least one of the first group of bits and the second group of bits is assigned by concatenating multiple non-contiguous portions of the unique mobile station identification;
   generating a first page message that contains the first group of bits on the first paging channel; and
   generating a second page message that contains the second group of bits on the second paging channel, the first group of bits and the second group of bits together comprise all bits of the unique mobile station identifier.

10. An apparatus for facilitating paging of a mobile station to alert the mobile station to enter into a state pursuant to performance of a communication service, said apparatus comprising:
    a detector configured to detect a first group of bits communicated on a first paging channel and to detect a second group of bits communicated on a second paging channel, in which at least one of the first group of bits and the second group of bits has been assigned by concatenating multiple non-contiguous portions of the unique mobile station identification; and
    a determiner configured to determine whether the mobile station is paged responsive to determination of whether the first group of bits and the second group of bits together correspond to a unique mobile station identifier, the first group of bits and the second group of bits combined together comprise all bits of the unique mobile station identifier.

11. The apparatus of claim 10 further comprising a combiner configured to combine the first group of bits and the second group of bits.

12. The apparatus of claim 11 wherein said determiner is further configured to determine a subgroup of the second group of bits to a second portion of the second locations of the unique mobile station identifier field.

13. A method for facilitating paging of a mobile station to alert the mobile station to enter into a state pursuant to performance of a communication service, said method comprising:
    detecting a first group of bits communicated on a first paging channel to first locations of a unique mobile station identifier field;
    detecting a second group of bits communicated on a second paging channel wherein the first group of bits comprises first multiple non-contiguous portions of the unique mobile station identifier and wherein the second group of bits comprises second multiple non-contiguous portions of the unique mobile station identifier; and
    determining whether the mobile station is paged responsive to determination of whether the first group of bits and the second group of bits together correspond to a unique mobile station identifier, the first group of bits and the second group of bits combined together comprise all bits of the unique mobile station identifier.

* * * * *